UNITED STATES PATENT OFFICE.

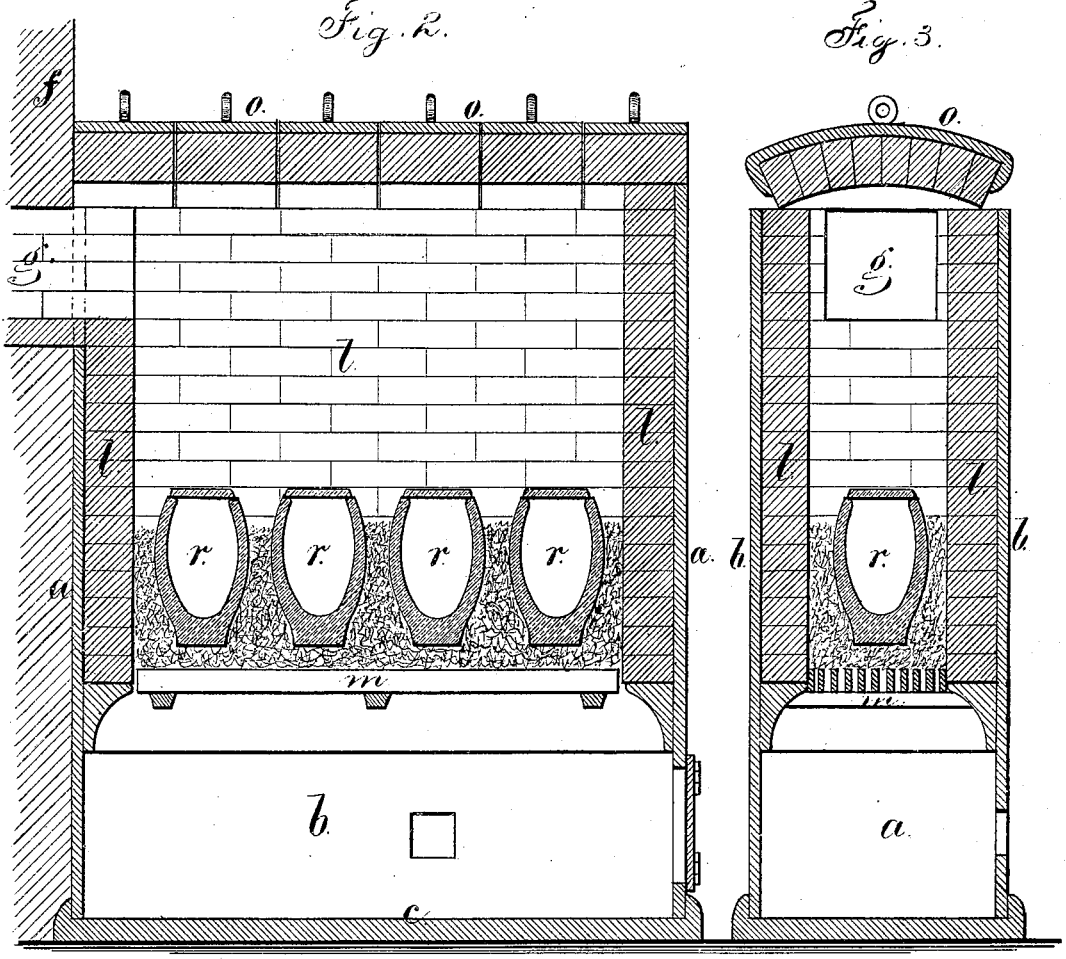

ALBERT C. LEWIS, OF BROOKLYN, NEW YORK.

IMPROVEMENT IN FURNACES FOR MELTING STEEL.

Specification forming part of Letters Patent No. 150,248, dated April 28, 1874; application filed February 12, 1874.

*To all whom it may concern:*

Be it known that I, ALBERT C. LEWIS, of Brooklyn, in the county of Kings and State of New York, have invented an Improvement in Furnaces for Melting Steel, of which the following is a specification:

Furnaces for melting steel are usually made square, or nearly so, and receive four crucibles or pots placed quadrangularly at about equal distances from each other and from the sides of the furnace.

In practice, I find that furnaces thus constructed are not reliable, because the metal is not subjected uniformly to the action of the heat. The pots are liable to crack, and the time consumed in melting and preparing the cast-steel is so various that where the metal has to be cast from several crucibles at the same time some will be ready before the others, thus preventing uniformity in the quality of the metal. I am unable to account for this practical difficulty except upon the ground that the fire is not uniform around the pots, the portion in the center having to act upon four pots, while the fuel toward the angles of the furnace is greater in proportion and acts in conjunction with the heat reflected from the walls of the furnace to render the pots the highest temperature at the sides that face the walls of the furnace.

My invention is made for the purpose of equalizing the action of the heat upon the pots; and by the use of my improvement I find that great uniformity in time of melting and in the quality of the metal are obtained, and the heat is equal, or nearly so, on all sides of the pot. The pots last longer, and time is saved, because the metal is more rapidly melted.

I employ a long, narrow, and deep furnace adapted to receive four pots in a row, and proportioned with reference to obtaining uniformity of fuel and heat spaces all around all the pots; thereby each part of each crucible is subjected to nearly the same temperature, so that the melting of the steel proceeds with uniformity and rapidity, and the pots are not liable to being broken from inequality of temperature.

In the drawing, Figure 1 is a plan of the furnace and pots. Fig. 2 is a sectional elevation of the same, and Fig. 3 is a transverse section.

The metallic plates $a\ a$, $b\ b$, and $c$ form the inclosure for the furnace. These will usually be placed in the earth and contiguous to the wall $f$, so that the attendants are above the furnace, and the escape heat passes by the flue $g$, beneath the steam-boiler for an engine, or is otherwise economized. The lining $l$, of fire-brick, is supported by ledges around the insides of the metallic case, and the grate-bars $m$ support the fuel and pots, and the removable covers $o\ o$ serve to give access to the furnace from above. The pots $r$ are placed in a row within the furnace and surrounded by the fuel. The internal measurements of the furnace are such, in comparison with the pots as placed in a row, that the distances between the pots and between the sides of the furnace and the pots will be uniform, or nearly so; thereby the action of the fuel will be the same, or nearly so, on all sides of the respective pots, and the reflected heat from the interior of the furnace-walls will be equal, or nearly so, on all parts of the pot, and the depth of the furnace, being more than twice the height of the pots, prevents the pots being cooled even when the covers are removed for inspecting the crucibles.

The ash-pit is closed by a door or stopper, and the blast of air from a blower is introduced through an opening of about four inches in diameter placed about as represented, so as to equalize the action of the air with respect to the escape-flue.

I am aware that a furnace for melting steel has been made with half the capacity of an ordinary four-pot steel-furnace, and receives two pots; but this is not adapted to containing the amount of fuel required in working economically, and only a very small charge can be introduced into each furnace. In my furnace there is a saving in fuel over the ordinary four-pot steel-furnace, and the time consumed in melting is lessened, and the melting rendered much more uniform.

I do not claim a metal furnace-case lined with fire-brick, as this has been used.

I claim as my invention—

The oblong steel-furnace adapted to receive four or more pots in a row, and proportioned, substantially as specified, to furnish a nearly uniform fuel-space around each pot, substantially as set forth.

Signed by me this 9th day of February, A. D. 1874.

ALBERT C. LEWIS.

Witnesses:
GEO. T. PINCKNEY,
CHAS. H. SMITH.